June 30, 1942.  F. HAYES  2,288,191
NUT CRACKING MACHINE
Filed Feb. 5, 1941  3 Sheets-Sheet 3

Inventor
Frank Hayes
By Lyon & Lyon
Attorneys

Patented June 30, 1942

2,288,191

UNITED STATES PATENT OFFICE 2,288,191

NUTCRACKING MACHINE

Frank Hayes, El Monte, Calif.

Application February 5, 1941, Serial No. 377,419

7 Claims. (Cl. 146—12)

This invention relates to nut cracking machines, and more particularly to a machine for cracking irregular shaped nuts such as walnuts.

This invention is particularly directed to an improvement in the cracking machine disclosed in Patent No. 1,787,746 granted to me January 6, 1931.

In the cracking of articles, particularly those of irregular shape and surface contour, economical and successful cracking to produce a high percentage of "halves" requires a machine which will have a high efficiency of operation, i. e., one which will handle the articles with a very low percentage of failures, both from a standpoint of nut positioning and effective cracking. As thousands of pounds of such articles are required to be cracked, the cost of such cracking must be very low, both from efficiency of handling, effectiveness of cracking (a very low percentage of crushed or broken nut halves) and a low maintenance cost of the machines used.

It is therefore an object of this invention to provide a cracking machine particularly applicable for cracking of irregular shape and surface articles, such as walnuts, and which is provided with an improved form of cracking head, including a yieldable head member actuated by a hydraulic drive.

Another object of this invention is to provide a cracking machine adapted for high speed operation, intermittent in character, and provided with a novel nut cracker drive means.

Other objects and advantages of my invention it is believed will be apparent from the hereinafter set forth description of a predetermined embodiment of my invention as illustrated in the accompanying drawings.

Figure 1:
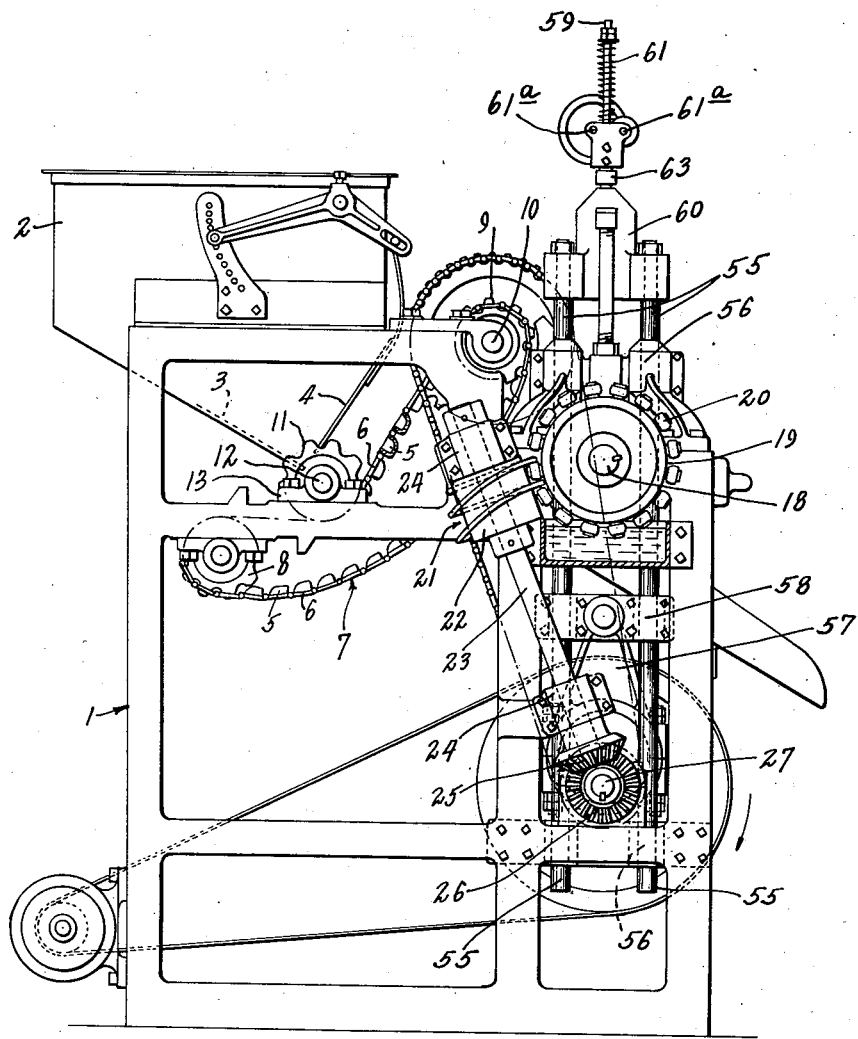
Figure 1 is a side elevation of a cracking machine embodying my invention.
Figure 2:
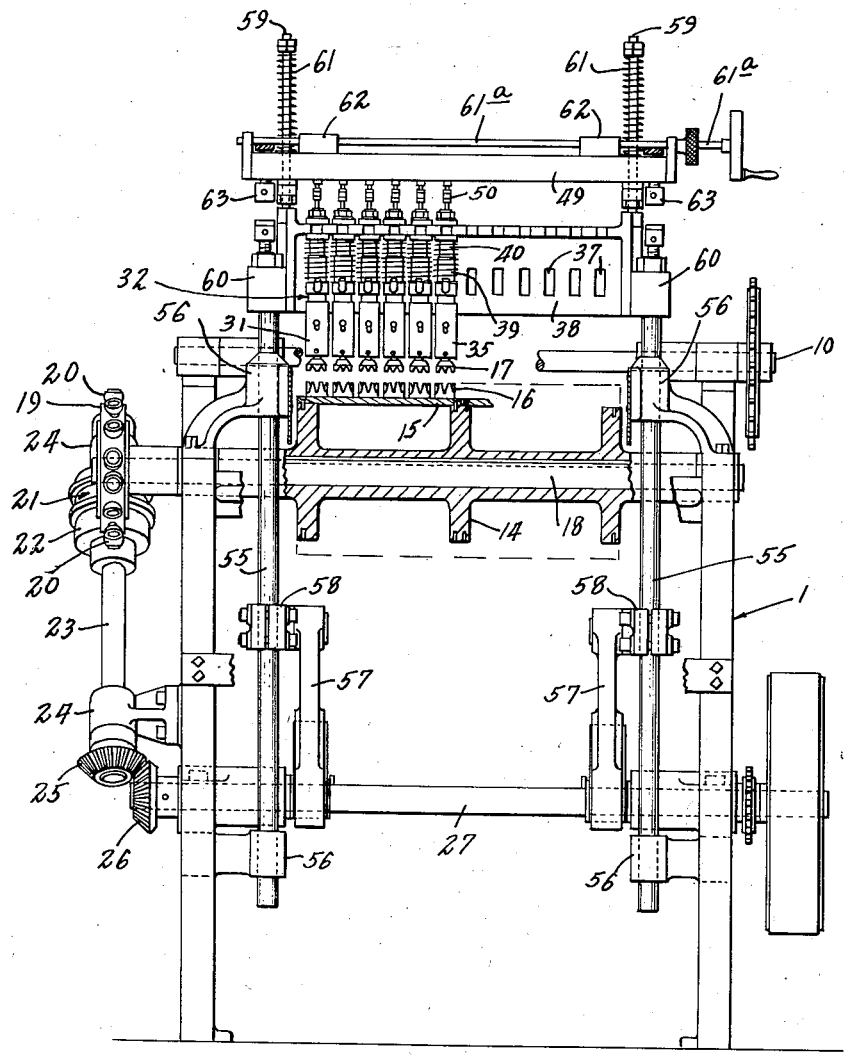
Figure 2 is a front elevation partly in vertical section and partly broken away.

In the preferred embodiment of my invention illustrated, 1 indicated a frame supporting a hopper 2 into which the walnuts to be cracked are dumped. The nuts travel down the inclined hopper bottoms 3 and 4 and into the conveyer cups 5 from the hopper throat substantially as illustrated and described in my Patent No. 1,787,-746 herein referred to. The cups 5 are formed in the conveyer bars 6 forming the inclined conveyer 7. The conveyer 7 is of the chain type and is trained over the sprockets 8 and 9, the sprockets 9 being secured to the drive shaft 10. Idlers 11, journaled on the idler shaft 12, determine the angle of the upward flight of the conveyer below the throat of the hopper 2. The position of the idlers 11 is determined by the adjustably mounted bearings 13 for the idler shaft 12.

The nuts are transferred from the cups 5 to the cracking drum 14 on which the prong bars 15 are mounted. The prong bars 15 are releasably stapled to the drum 14 and each bar is provided with a plurality of nut receiving prong cups 16, each of which cups is adapted to receive a nut from the conveyer 7 as the drum is given a rapid intermittent forward movement. The prong bars 15 hold the nuts in position for cracking under the cracker heads 17.

The drum 14 is secured to the drum shaft 18. The shaft 18 is given an intermittent, rapid drive through the medium of a driving head 19 secured to the shaft 18. The periphery of the head 19 is provided with spaced bearing members 20 equally spaced in effect to provide rotating bearing teeth of a worm wheel. The rotating bearing members 20 engage in the worm teeth path 21 of a modified worm 22. The worm 22 is secured to the shaft 23 supported in bearings 24. The shaft 23 is driven by gears 25 and 26 from the main drive shaft 27. The shaft 27 is driven in any suitable manner.

Figure 4:
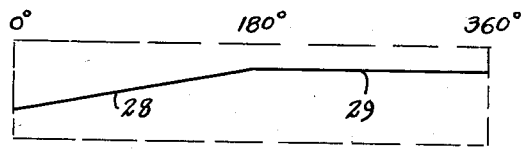
Figure 4 is a diagrammatic view of the teeth structure of the worm driving member.
Figure 3:
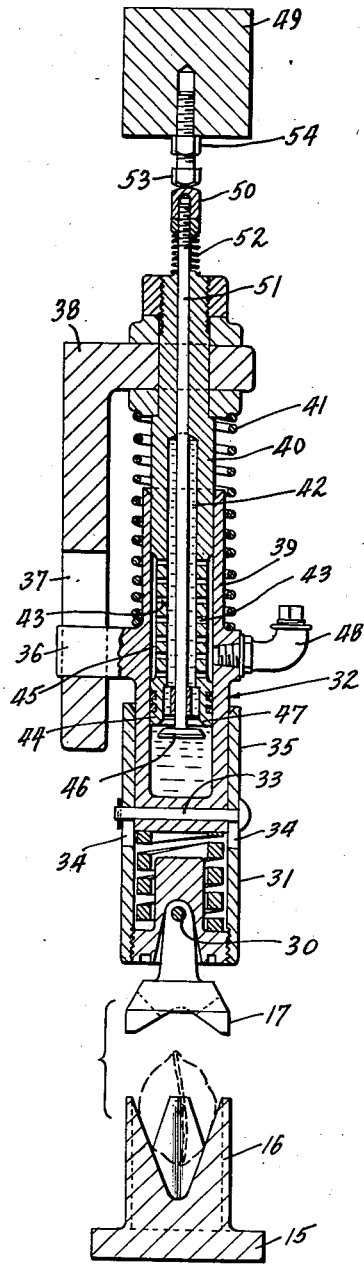
Figure 3 is an enlarged sectional view of one of the hydraulic drive members for one of the cracker members.

The modified worm 22 operating in conjunction with the bearing members 20 provides the intermittent drive for the drum 14 giving the rapid, definite start and stop drive required. The teeth path 21 is provided such that the advancing section is formed with the tooth pitch for approximately 180° and without pitch for the remaining 180° of the circumference as indicated at 28 and 29 in Figure 4.

The cracker heads 17, one for each cup of the bars 15 longitudinally of the drum 14, are pivotally supported on pins 30 secured to the plunger heads 31. The heads 31 are yieldably secured to the reciprocating heads 32 on pins 33 mounted in slots 34 in the sleeve sections 35. The positioning of the cracker heads 17 in this manner on the slidably positioned pins 33, and the holding of the same by means of the relatively heavy springs illustrated provides a safety factor to prevent the breaking of the cracker heads 17 or the plunger cups 16 should a rock or other relatively non-crackable object find its way into any such cup 16.

The reciprocating heads 32 carry guide arms 36 mounted in guide slots 37 in the drive head 38. The reciprocating heads each include a cylinder member 39 and a piston 40. The pistons 40 are secured to the drive head 38 and a spring 41 urges the cylinder 39 along the piston 40.

The piston 40 is drilled longitudinally to provide a fluid passage 42 and laterally to provide passages 43. The piston 40 is relieved above the head 44 as indicated at 45. A valve 46 is mounted to seat against a seat 47 to close the longitudinal fluid passage 42. The fluid passages and the cylinder 39 are filled with a fluid such as oil through a filling opening 48. A valve relief bar 49 is provided to engage the nuts 50 adjustably secured to the valve rods 51. Springs 52 are provided for normally maintaining the valves 46 seated. Striker bolts 53 are threaded to the valve relief bar 49 in position to engage the nuts 50. Lock nuts 54 determine the adjustment of the bolts 53 on the relief bar 49.

The driver head 38 is secured by cross heads 60 to the reciprocating rods 55 guided in bearings 56. Pitmans 57 drive the rods 55 from the shaft 27. The pitmans 57 are pivotally connected to cross heads 58 secured to the rods 55.

The valve relief bar 49 is mounted upon rods 59 secured to the cross heads 60. Springs 61 yieldingly urge the bar 49 downwardly tending to contact the bolts 53 with the heads 50. Shafts 61a, journaled in bearing members 62 carried by the bar 49 are geared to stops 63 to raise or lower the same relative to the bar 49, and to thereby determine the limit of downward movement of the relief bar 49 under the influence of the springs 61.

The operation of the nut cracking machine embodying my invention is:

Nuts dumped into the hopper 2 are delivered into the cups 5, transferred to the holding prongs 16 of the cracker drum 14. The drum 14 is intermittently advanced to position the prong holders 16 under the cracker heads 17. In timed relation the driver 38 is moved downwardly forcing the pistons 40 down. The valves 46 are open so that fluid flows from the cylinders 39 into the hollow pistons 40 until the cracker heads 17 are adjusted to the sizes of the nuts carried by the prongs 16, and they have adjusted themselves to the position of the nut crackers 17, pivoting on their supporting pins 30. At the adjusted point of downward travel of the cracker assembly, the bolts 53 are disengaged from the heads 50 of the valve rods 51, permitting the valves 46 to seat. Further downward movement of the drive head 38 then forces the cracker head 17 to crack the said nuts as the said heads are driven through the medium of the closed fluid column between the piston 39 and cylinder 40. On raising of the driver 38, the springs return the piston and cylinder to position to unseat the valves 46 for a further cracking operation.

This form of hydraulic drive permits of the very rapid, and fatigueless drive required for very rapid cracking operations.

Having fully described my invention, and a preferred embodiment thereof, it is to be understood that my invention is susceptible of wide variation within the scope of the appended claims.

I claim:

1. In a cracking machine including a cracker member, a drum carrying the cracker member, a cracker head, means for intermittently advancing the drum to position the cracker member under the cracker head, said means including a worm wheel secured to the drum and having equally spaced bearing members forming a worm gear, and a driven worm member including a bearing member actuating worm having a pitch for only a portion of its extent, and being straight for another portion of its extent.

2. In a device for cracking nuts, the combination of a nut supporting member for supporting a nut to be cracked, a nut cracking member movable toward said supporting member for cracking said nut, means for moving said nut cracking member toward said supporting member including a movable member, means forming a chamber containing liquid between said movable member and said cracking member, means for moving said movable member in a direction to compress said liquid and move said cracking member, and valve means for releasing liquid from said liquid chamber to provide for stopping of said cracking member by said nut and for continued movement of said movable member, said valve means including an element movable relative to said movable member for closing said valve means, valve actuating means for moving said element at a predetermined point in the movement of said movable member for closing said valve means after said cracking member has been positioned against said nut, and means actuatable during the operation of said device for adjusting said valve actuating means to vary the extent of movement of said cracking member after closing of said valve means.

3. In a device for cracking nuts, the combination of a nut supporting member for supporting a nut to be cracked, a nut cracking member movable toward said supporting member for cracking said nut, means for moving said nut cracking member toward said supporting member including a movable member, means forming a chamber containing liquid between said movable member and said cracking member, means for moving said movable member in a direction to compress said liquid and move said cracking member, resilient means urging said cracking member away from said movable member, and valve means for releasing liquid from said liquid chamber to provide for stopping of said cracking member by said nut and for continued movement of said movable member against the action of said resilient means, said valve means including an element movable relative to said movable member for closing said valve means, valve actuating means for moving said element at a predetermined point in the movement of said movable member for closing said valve means after said cracking member has been positioned against said nut, and means actuatable during the operation of said device for adjusting said valve actuating means to vary the extent of movement of said cracking member after closing of said valve means.

4. In a device for cracking nuts, the combination of a nut supporting member for supporting a nut to be cracked, a nut cracking member movable toward said supporting member for cracking said nut, means for moving said nut cracking member toward said supporting member including a movable member, means forming a chamber containing liquid between said movable member and said cracking member, means for moving said movable member in a direction to compress said liquid and move said cracking member, and valve means for releasing liquid from said liquid chamber to provide for stopping of said cracking member by said nut and for continued movement of said movable member, said valve means including a valve element carried by said movable member and movable relative to said movable member for closing said valve means, resilient means urging said element to valve closing position a valve control member moving with said movable member for holding said element in open valve position, means for stopping said control member at a predetermined point in the movement of said movable member for closing said valve means after said cracking member has been positioned against said nut and means actuatable during the operation of said device for adjusting the position of said stopping means to vary the extent of movement of said cracking member after closing of said valve means.

5. In a device for cracking nuts the combination of a nut support for supporting a nut to be cracked, a piston member, a cylinder member receiving said piston member and providing a chamber containing liquid between said piston member and cylinder member, a cracker head carried by one of said members, means engaging the other of said members for moving said members and said head as a unit toward said nut support, valve means for releasing liquid from said chamber when said head engages said nut and means for thereafter closing said valve means to confine said liquid and cause said cracker head to crack said nut.

6. In a device for cracking nuts, the combination of a nut support for supporting a nut to be cracked, a piston member, a cylinder member receiving said piston member and providing a chamber containing liquid between said piston member and said cylinder member, a cracker head carried by one of said members resilient means for urging said cylinder member and piston member apart, means engaging the other of said members for moving said members and said head as a unit toward said nut support, valve means for releasing liquid from said chamber when said head engages said nut whereby said head is urged against said nut by said resilient means, means for thereafter closing said valve means to confine said liquid and cause further movement of said head to crack said nut.

7. In a device for cracking nuts the combination of a nut support for supporting a nut to be cracked, a piston member, a cylinder member receiving the piston member and providing a chamber containing liquid between said piston member and cylinder member, a cracker head carried by one of said members, means engaging the other of said members for moving said members and said head as a unit toward said nut support, valve means carried by said other of said members, resilient means urging said valve means to closed position, valve opening means movable with said other of said members for holding said valve means open for releasing liquid from said chamber when said head engages said nut and means for thereafter stopping said valve opening means to cause closing of said valve means to confine said liquid and cause said cracker head to crack said nut.

FRANK HAYES.